United States Patent [19]
Poulsen et al.

[11] Patent Number: 5,482,187
[45] Date of Patent: Jan. 9, 1996

[54] DISPENSER FOR VISCOUS SUBSTANCES

[75] Inventors: Kevin A. Poulsen, Newtonville; James H. Edwards, Winchester; Peter A. Latham, Boston, all of Mass.

[73] Assignee: Hygienix, Inc., Cambridge, Mass.

[21] Appl. No.: 346,533

[22] Filed: Nov. 29, 1994

Related U.S. Application Data

[63] Continuation of Ser. No. 120,976, Sep. 13, 1993, abandoned.

[51] Int. Cl.$^6$ .................................................. G01F 11/00
[52] U.S. Cl. ........................... 222/207; 222/78; 222/257; 222/321.8; 222/340; 222/383,1
[58] Field of Search .................................. 222/256, 257, 222/78, 207, 209, 321.6, 383.3, 340, 325, 327, 386, 386.5, 383.1, 321.3, 221.8

[56] References Cited

U.S. PATENT DOCUMENTS

| | | | |
|---|---|---|---|
| 3,105,612 | 10/1963 | Krasnoff et al. | 222/78 |
| 3,223,289 | 12/1965 | Bouet | 222/209 |
| 3,252,624 | 5/1966 | Watson, Jr. | 222/340 X |
| 4,949,875 | 8/1990 | Kuo | 222/383 X |
| 5,014,881 | 5/1991 | Anaris | 222/383.3 |
| 5,058,780 | 10/1991 | Plester et al. | 222/321.8 |
| 5,228,595 | 7/1993 | Booker | 222/78 |

FOREIGN PATENT DOCUMENTS

| | | | |
|---|---|---|---|
| 0376097 | 7/1990 | European Pat. Off. | 222/256 |
| 2640942 | 6/1990 | France | 222/383.3 |
| 2083142 | 3/1982 | United Kingdom | 222/209 |

*Primary Examiner*—Andres Kashnikow
*Assistant Examiner*—Lisa Douglas
*Attorney, Agent, or Firm*—Cesari and McKenna

[57] ABSTRACT

A dispenser for a viscous substance includes a disposable plastic container for the substance and a pump permanently unreleasably mounted to the top of the container for pumping the substance from the container. The pump includes a housing communicating with the interior of the container and a pumping assembly including a movable housing wall and a tubular member connected to the wall and being movable along a motion axis between extended and retracted positions relative to the housing. An actuator is provided for the pump which includes a support member removably mounted to the cartridge, a target member movably mounted to the support member and linkage for releasably linking the target member to the tubular member so that when the target member is moved in one direction, the pumping assembly is moved to its extended position in the housing and when the target member is moved in another direction, the pumping assembly is moved to its retracted position in the housing. Preferably, the connection between the tubular member and the movable housing wall is a lost-motion connection.

25 Claims, 6 Drawing Sheets

FIG. 9

DISPENSER FOR VISCOUS SUBSTANCES

RELATED APPLICATION

This application is a continuation of Ser. No. 08/120,976, filed Sep. 13, 1993, now abandoned.

FIELD OF THE INVENTION

This invention relates to a dispenser for viscous substances such as toothpaste. It relates more particularly to a dispenser of this general type which is hygienic, easy to use and esthetically pleasing to the eye.

BACKGROUND OF THE INVENTION

Paste-like substances such as toothpaste have historically been dispensed from flexible metal or plastic tubes. When the tube is squeezed, the paste is extruded from a nozzle at an end of the tube. However, collapsible tube-type paste dispensers are rather unsightly. Studies have shown that up to 80% of toothpaste tubes remain on a sink or counter, never being stored in a cabinet or draw. Therefore, a tube of toothpaste, particularly when deformed or rolled up, is considered an eyesore.

Also, a collapsible tube is not a particularly hygienic package for dispensing a substance such as toothpaste which is ingested into the body. Studies have found that such tubes can acquire a host of germs through contact of the tube nozzle with successive toothbrushes. Germs on one brush are transferred to the nozzle of the tube, where build up of toothpaste provides a fertile ground for germs to multiply. Therefore, when another brush contacts the nozzle, those germs are transferred to the second brush. As a practical matter, because of the viscosity of the paste, brushes must often be brought into contact the tube nozzle in order to sever the extruded beads of paste.

In an effort to avoid the above disadvantages of collapsible tubes, various types of paste dispensers have been developed which are designed to be more permanent. These permanent dispensers appeal to consumers because of their durability, styling and convenience. Some of these prior dispensers are designed to accommodate a standard toothpaste tube. Actuation of the dispenser results in the squeezing of the tube and the ejection of the paste from the tube. Examples of such dispensers are disclosed in U.S. Pat. Nos. 3,917,118, 4,418,840 and 4,258,864. However, these permanent dispensers which utilize tube inserts, require significant force to deform the tube and thus dispense the paste. This is inefficient from an energy standpoint. Also, the mechanisms required to effect the tube deformation are usually rather complex, resulting in products which cannot be priced low enough to appeal to a mass market. Also, some of these prior dispensers require an extension nozzle which results in toothpaste remaining in a portion of the dispenser after the empty tube is discarded. Accordingly, when a new tube of paste is mounted in the dispenser, there is carryover of paste from the old tube to the new tube. This is objectionable to many consumers.

As a solution to the problems inherent in toothpaste tubes and dispensers which use replacement tubes, pump dispensers have been developed. These usually consist of a container of paste with a finger-actuated pump at the top of the container. When the pump is actuated, paste is drawn from the container and ejected or extruded from a nozzle in the pump. Although these pump-type dispensers generally contain less paste than a tube, they minimize the amount of paste wasted when the pump is discarded. Also, because a pump-type dispenser does not deform, it is more esthetically pleasing when left exposed on a countertop.

However, conventional pump-type dispensers also have certain disadvantages. Some do not provide closures for the pump nozzles. Therefore, the paste at the nozzle opening in contact with the air tends to harden producing a paste build-up around the nozzle orifice. This exposed paste is not only unsightly, it also promotes the growth of bacteria around the dispensing nozzle. In extreme cases, the hardened paste residue can even occlude the nozzle orifice making it difficult to pump fresh paste from the dispenser.

Some prior reusable dispensers and pump-type dispensers are relatively complex, being composed of many different metal and plastic parts which are difficult to make and to assemble. This complexity results in products that cannot be priced inexpensively enough to capture most of the mass market. Moreover, they are not environmentally friendly because they are difficult to recycle being composed of a mix of metal and plastic parts. In fact, to many consumers, they are considered examples of overpackaging.

Additionally, most conventional pump-type paste dispensers are not ergonomically designed to be actuated in situ. Invariably, the user has to pick up and hold the dispenser in one hand while holding the toothbrush in the other hand. The user must then maneuver the dispenser over the brush while pressing down on the pump trigger or actuator with the thumb to deposit paste onto the brush. Sometimes the pump trigger must be depressed more than once to dispense the desired amount of paste. Finally, a movement to produce a shearing action is required to separate the extruded bead of paste from the dispenser nozzle. This is usually done by wiping the brush against the nozzle. Thus, until now, this type of dispenser has had the same propensity from accumulating and transferring bacteria and germs as the old toothpaste tube discussed above.

SUMMARY OF THE INVENTION

Accordingly, it is an object of the present invention to provide an improved dispenser for viscous or paste-like products such as toothpaste, lotion, liquid soap and the like.

Another object of the invention is to provide a dispenser of this type which is esthetically pleasing to the eye.

A further object of the invention is to provide a paste dispenser which is rugged and reliable.

Yet another object of the invention is to provide such a dispenser which can dispense paste from a nozzle hygienically while the dispenser is at rest on a countertop, yet which is also suitable for hand-held operation and for travel.

Still another object is to provide a paste dispenser which is ergonomically designed to be very easy to use even by small children and infirm adults.

A further object of the invention is to provide a paste dispenser which dispenses paste from a relatively inexpensive removable cartridge that is made entirely of plastic and is readily recyclable.

Another object of the invention is to provide a paste dispenser cartridge which is composed of a minimum number of inexpensive parts.

An additional object of the invention is to provide a paste dispenser cartridge which dispenses paste cleanly and reliably to a receiving surface.

Still another object of the invention is to provide an actuator for a paste dispenser cartridge which is of relatively simple construction and should have a long useful life.

Other objects will, in part, be obvious, and will, in part, appear hereinafter. The invention accordingly comprises the features of construction, combination of elements and arrangement of parts which will be exemplified in the following detailed description, and the scope of the invention will be indicated in the claims.

Briefly, our dispenser includes a sturdy, non-deformable holder which supports an inexpensive replaceable paste container. A pump is mounted to the top of the container so that it projects above the holder. The pump may be permanently attached to or be separable from the container. A pump actuator, which may be considered part of the holder, is removably attached to the pump so that it encloses and mostly conceals the pump. Preferably, the exterior shapes and/or appearances of the actuator and holder are coordinated so as to present a unifying theme. For example, the actuator may be designed to resemble the head of an animal or some character and the holder may be shaped or colored to suggest the body of that animal or character, the overall objective being to give the dispenser an esthetically pleasing appearance. Preferably, also, the actuator and holder are designed so that the dispenser as a whole constitutes a relatively sturdy, stable presence on a countertop or the like and can be used while remaining in place on that surface.

Thus, by designing the dispenser so that it has a permanent holder/actuator and a disposable paste container, the dispenser as a whole can be aesthetically pleasing in appearance and easy to use, while still being less expensive to make than prior comparable pump-type dispensers.

The holder/actuator being a one-time purchase can be more stable and sturdy than conventional pump-type dispensers and incorporate some of the more expensive functional components of the dispenser such as metal springs and links. This, in turn, enables the replaceable part of the dispenser, whether it consists of the paste container alone or the container and the pump, to be simplified considerably and be composed entirely of plastic so that it can be made inexpensively enough to appeal to a larger consumer market. Because there are fewer parts in the cartridge and all of the parts are plastic, molding costs are reduced, automated production and assembly lines for the device are simplified, and there results an all-plastic package which can be recycle easily to minimize material waste.

The pump section of the dispenser, comprises a piston which can be reciprocated in a pump housing which may be permanently or releasably mounted to the top of the paste container. Preferably, the housing axis is oriented perpendicular to the longitudinal axis of that container. A passage, which may contain a check valve, leads from the container to the housing. The piston includes a tubular piston rod which has a lost motion connection with a plunger inside the housing. The piston rod, in addition to moving the plunger, has a forward working end segment which functions as a paste dispensing nozzle for the dispenser. An opening is provided in the forward end of the housing for slidably receiving the piston rod so that the rod can be moved from an extended position wherein its working end extends out beyond the housing and a retracted position wherein the working end is recessed into that housing passage. The lost motion connection between the piston rod and the plunger is such that when the rod is moved toward its fully extended position, before reaching that position, the rod engages and moves the plunger to an advanced position within the housing. Conversely, when the rod is moved from its extended position to its retracted position, on the way, it engages and moves the plunger to a retracted position within the housing. Thus, as the piston rod is reciprocated back and forth within the housing, so is the plunger, but over a lesser excursion.

The tubular piston rod, which will be described later in detail, is closed at both ends. However, a small orifice is provided in the bottom wall of the rod adjacent to the forward or working end thereof. Also, additional openings are provided in the wall of the piston rod segment inside the housing in the vicinity of the plunger. When the piston rod is moved toward its fully extended position, first the working end of the rod, which functions as the dispenser nozzle, is extended from the housing thereby uncapping the dispensing orifice, then the rod engages and advances the plunger. Any paste inside the housing, ahead of the plunger is forced into and along the piston rod and out through the orifice at the nozzle end thereof where it may be deposited onto a toothbrush. After the plunger has completed its advance stroke, thereby depositing a user-selected amount of paste on the brush, the piston rod may be moved toward its fully retracted position. Before reaching that position, the rod engages and moves the plunger toward its retracted position within the housing. This creates a vacuum in the housing which draws additional paste from the cartridge container into the housing to provide the paste requirement for the next pumping cycle.

Also, as will be described in more detail later, the outside diameter of the piston rod is stepped, being smaller at the forward half of the rod than at the rear half thereof that passes through the plunger. Resultantly, when the piston rod begins to retract, a small vacuum is created in the housing which is sufficient to draw paste back through the piston rod and away from the nozzle orifice. This helps to separate the paste at the dispensing orifice from the paste bead deposited on the brush and also helps to keep the orifice clean.

Just before the piston rod reaches its fully retracted position in which the nozzle end of the rod is received in the housing passage, any residual paste at the nozzle orifice is sheared off by the passage wall so that the paste bead deposited on the brush is assuredly separated from the paste supply in the dispenser without requiring the dispenser to be contacted by the brush. The fit between the piston rod and its passage in the pump housing is close enough so that there is minimal paste residue at the nozzle end of the rod after the rod is fully retracted into the housing passage.

Additionally, when the piston rod is in its fully retracted position, the nozzle orifice is located inside the housing passage and so is completely covered by the housing passage wall which effectively functions as a cap that closes the orifice. Therefore, the paste inside the nozzle does not tend to dry out or harden so that it is ready to be ejected during the next pumping cycle.

The piston rod is moved between its extended and retracted positions by the dispenser actuator which is removably engaged to the pump section of the dispenser as described above. The actuator includes a movable target member which is connected by suitable linkage means to the rear end of the piston rod so that when the target member is depressed, the rod is moved to its fully extended position and when the target member is released, the rod will be moved to its fully retracted position. Thus, repeated pressings of the target member will cause the dispenser to dispense successive beads of paste from the dispenser cartridge. Moreover, the size of each paste bead dispensed will depend directly upon the extent to which the target member is depressed.

When the container is empty of paste, the actuator may be disengaged from the pump section and the container removed from its holder if the replaceable cartridge consists of a container with an integral pump section, after the actuator is attached to the new cartridge, additional paste may be dispensed as desired. If the cartridge consists only of the paste container, the pump section is disconnected from the empty container and installed on the new container. Then the actuator is reattached to the pump section and the new container is seated in the holder in preparation for use.

It will be apparent that the present dispenser can dispense a paste-like product in a hygienic manner from an economical disposable cartridge which may be made entirely of low-cost plastic material. All of the more expensive plastic parts and any metal parts required to dispense the paste may be located in the more permanent dispenser holder/actuator. Thus, the dispenser as a whole, while allowing more features to be built into it, provides an esthetic and more durable enclosure with improved ergonomics as compared with prior disposable dispensers.

BRIEF DESCRIPTION OF THE DRAWINGS

For a fuller understanding of the nature and objects of the invention, reference should be had to the following detailed description, taken in connection with the accompanying drawings, in which.

DETAILED DESCRIPTION OF ILLUSTRATIVE EMBODIMENTS

Figure 1:
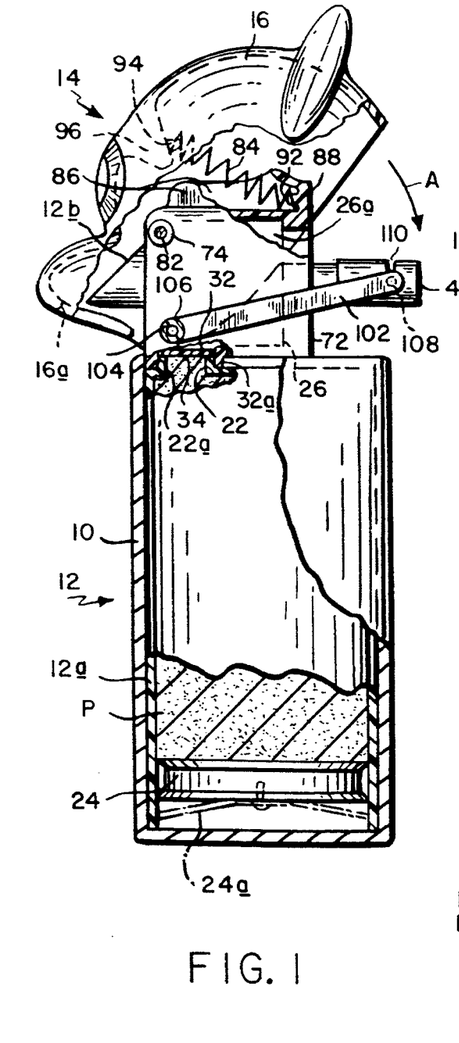
FIG. 1 is a side elevational view with parts broken away showing our new dispenser in its normal at rest position.
Figure 3:
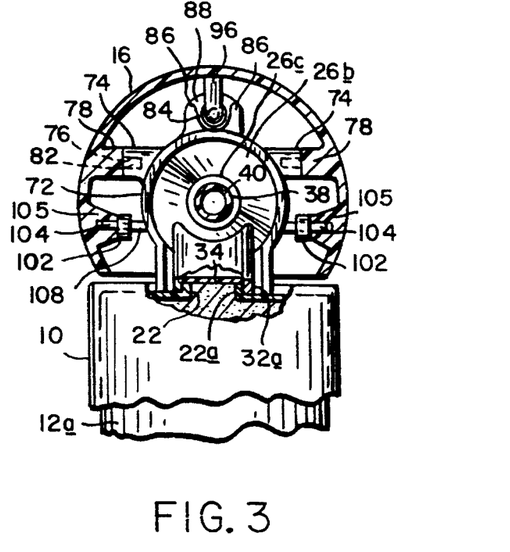
FIG. 3 is a sectional view taken along line 3—3 of FIG. 2.

Referring to FIGS. 1 and 3 of the drawings, our dispenser comprises a housing or holder 10 for receiving and retaining a disposable cartridge shown generally at 12 containing a viscous/or paste-like substance P such as toothpaste. Cartridge 12 may include a closed container section 12a which is retained in holder 10 and an integral pump section 12b at the top of container 12a which projects above holder 10. Alternatively, the disposable cartridge may consist of container 12a alone, with the pump section 12b being releasably attached to the top of the container as will be described later in connection with FIG. 9. The dispenser also includes an actuator shown generally at 14 which is removably attached to pump section 12b. The actuator includes a target member or head piece 16 which overlies and helps to conceal pump section 12b. Usually, holder 10 and head piece 16 are designed so that the dispenser can rest stably on a countertop or the like. Preferably also, the holder and head piece should be designed so that they combine and corporate to produce an overall design effect such as that of an animal or some theme character. For example, in the illustrated dispenser, the head piece 16 simulates the head of a bear and the holder 10, shown as being cylindrical, may be colored so as to simulate the body of the bear. Alternatively, the holder could be shaped like the body of a bear.

While we describe the dispenser as being primarily a counter top utensil, it should be understood that the dispenser cartridge may also be supported by a suitable wall mount or even be hand held while in use.

Figure 4A:
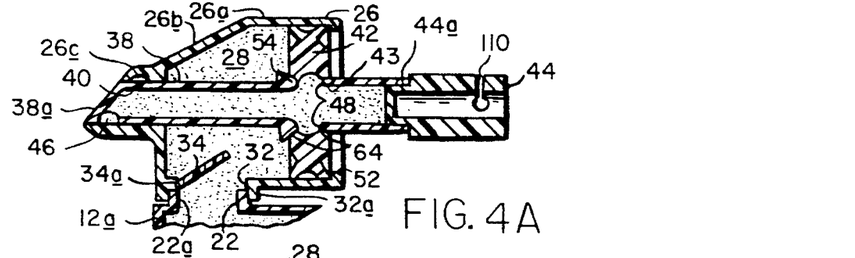
FIGS. 4A to 4E are fragmentary sectional views showing the pump section of the FIG. 1 dispenser in various operative positions during a pumping cycle.

Referring to FIGS. 1, 3 and 4A, the replaceable cartridge 12 of applicant's dispenser is made entirely of plastic and, as we shall see, consists of a minimum number of separate parts which can be manufactured and assembled at a relatively low cost. The illustrated paste container 12a is a cylindrical tube, open at the bottom, and with a small flanged opening 22 at the top adjacent to the front wall of the tube. The lower end of container 12a is closed by a conventional follower piston 24 which can move upwards within container 12a. As the paste P is drawn out of container through opening 22 by the pump section 12b, piston 24 moves upwards to reduce the volume within the container to prevent the build-up of a vacuum therein. However, as we shall see, container 12a could also be formed as a long bellows or a pouch or some other such structure whose internal volume reduces as substance P is pumped out of the container by pump section 12b.

The pump section 12b is coupled to the flange 22a surrounding the container opening 22. The pump section illustrated in FIGS. 1 and 2 includes a rigid tubular housing 26 having a generally cylindrical rear segment 26a and a generally frustoconical forward section 26b which tapers down to a relatively small diameter cylindrical neck 26c at the front of the housing. The interior of housing 26 constitutes a pump chamber 28 and access to that chamber is had through an opening 32 in the bottom wall of housing section 26b. In the FIGS. 1 to 3 dispenser embodiment, a downwardly extending flange 32a encircles opening 32 and is dimensioned to be press-fitted onto, and sealed to, the upstanding flange 22a of container 12a to establish vacuum-tight communication between the interior of the container and the pump chamber 28. Preferably, a check valve 34 is provided at the pump housing opening 32 which permits only the upward flow of fluid through opening 32. Check valve 34 may be simply a flap which is connected by a living hinge 34a to the wall of opening 32 at one side of the opening, with the flap seating on the top of the flange 22a of container 12a as best seen in FIG. 4A.

If a check valve 34 is not used, then anti-backflow means shown in phantom at 24a in FIG. 1 should be provided to prevent piston 24 from moving downward in container 12a. Such means are well known; see e.g., U.S. Pat. Nos. 4,949,875 and 4,991,744.

Referring to FIG. 4A, slidably mounted in housing 26 is a piston composed of a tube 38 which is snugly, but slidably, received in a passage 40 through the housing neck 26c and a plunger 42 having an axial opening 43 which slidably receives tube 38 within the housing section 26a. Tube 38 functions not only as a piston rod, but also as the dispensing nozzle for the pump section 12b. For this, the forward or working end of tube 38 is closed by a wall 38a. The rear end of the tube is also closed, in this case by an actuator coupling 44 having a solid cylindrical forward end 44a plugged into the rear end of tube 38. However, a dispensing orifice 46 is provided in the bottom wall of tube 38 adjacent to the forward end wall 38a thereof. One or more additional openings 48 are formed in the wall of tube 38 about two thirds of the way along the tube from the end wall 38a. Also, for reasons to be described, the segment of tube 38 in front of opening 48 has a smaller outside diameter than the segment aft of that opening.

The piston, comprised of tube 38 and plunger 42, is reciprocatable within housing 26 in a direction generally perpendicular to the longitudinal axis of container 12a. However, the plunger 42 can only move back and forth within the cylindrical housing section 26a. Its forward motion is limited by the converging walls of housing section 26b and the rearward motion of the plunger 42 is stopped by a radially inwardly extending circular flange or ring 52 at the rear end of housing 26.

As stated previously, plunger 42 is slidably engaged on tube 38 which itself is slidable in the housing 26. The range of motion of the tube is limited by a radial rib 54 on the tube just forward of opening 48 therein which engages the forward end wall of the housing section 26b when the tube 38 is extended and which engages plunger 42 when the tube is retracted, the rearward motion of the plunger being stopped by flange 52 as noted above. The plunger is advanced or moved forward in housing 26 when it is engaged from behind by the actuator coupling 44. The plunger is retracted when engaged from the front by the rib 54 on tube 38.

Figure 2:
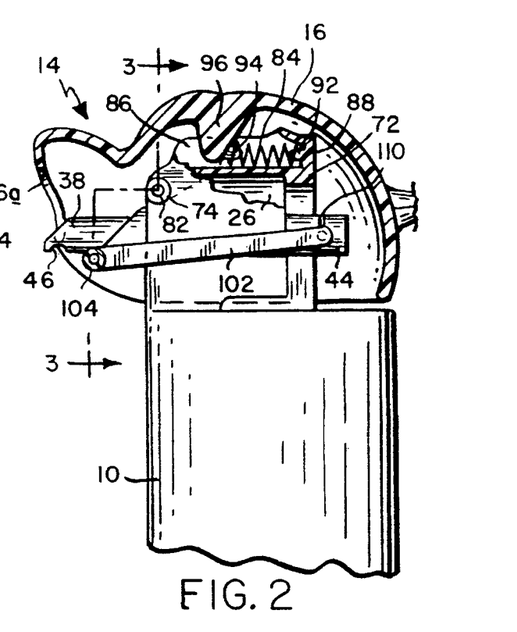
FIG. 2 is a fragmentary side elevational view with parts broken away showing the dispenser in the dispensing position.
Figure 4B:
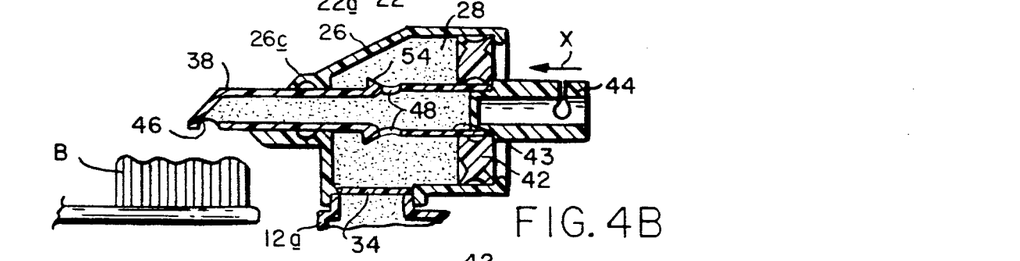
Figure 4C:
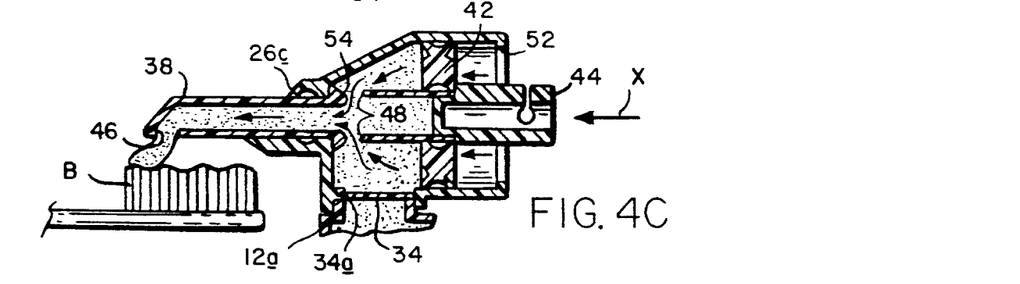

The dimensions of the various parts of the pump section 12b and the placements of the holes 46, 48 rib 54 and coupling 44 are such that while the excursions of the piston plunger 42 are limited by the length of housing section 26a, the tube 38 can be moved from a fully retracted position shown in FIGS. 1 and 4A wherein the dispensing orifice 46 is recessed into the passage 40 in housing neck 26c (when the piston plunger 42 is situated at the rear end of housing section 26a) and a fully extended position shown in FIGS. 2 and 4C wherein the dispensing orifice 46 is positioned a substantial distance in front of housing 26 (when the piston plunger 42 is located at the forward end of housing section 26a).

It should be noted that when tube 38 is in its fully retracted position shown in FIG. 4A, the dispensing orifice 46 is situated within the passage 40 in housing neck 26c. Tight tolerances are maintained between the tube 38 and the wall of passage 40 to prevent paste leakage at the forward end of the pump chamber 28 and to close the dispensing orifice 46 when the tube 38 is in its fully retracted position shown in FIG. 4A.

Parallel sliding seals 64 are provided at the wall of plunger opening 43 to minimize fluid leakage at the rear end of pump chamber 28. In this connection, it should be noted that when the tube 38 is in its fully retracted position shown in FIG. 4A, the opening(s) 48 in the tube wall is located within plunger opening 43 between the seals 64 and thus is isolated from pump chamber 28 for reasons that will become apparent later. On the other hand, when the tube 38 is moved toward its extended position, the opening(s) 48 is exposed ahead of plunger 42 so that fluid in the pump chamber 28 is free to flow through opening 48 and along tube 38 to dispensing orifice 46 at the forward or working end of that tube.

Referring to FIGS. 1 and 3 of the drawings, the main function of the actuator 14 is to reciprocate the tube 38 by way of the coupling 44. Accordingly, the actuator may take a variety of forms depending upon the particular type of dispenser and whether it is a stand alone or wallmounted or hand held unit. For the actuator specifically illustrated employing a head-piece 16 as the movable target member, the actuator may include a bracket 72 which is shaped to slidably engage the housing 26 of the pump section 12b from the rear of housing 26. Preferably, the bracket is flexible and resilient and slightly undersized so that it resiliently engages around the housing, extending down to the top of the container 12a so that there is minimal, if any, relative movement between the bracket and the pump section 12b. As best seen in FIG. 3, bracket 72 is provided with a pair of laterally extending ears 74 adjacent to the forward end of the bracket, the ears having collinear passages 76 extending from the outer ends of the ears inwardly toward bracket 72. The head piece 16 is formed with a pair of collinear posts 78 extending inwardly from opposite sides of the head piece. These posts have aligned end pins 82 which extend toward one another and are arranged to rotatably engage in the passages 76 of the bracket ears 74 so that the head piece 16 is pivotally connected to the bracket and swingable between the raised and lowered position shown in FIGS. 1 and 2, respectively.

The head piece 16 is biased toward its raised position shown in FIG. 1 by a coil spring 84 captured between head piece 16 and bracket 72. More particularly, a pair of laterally spaced apart walls 86 are formed at the top of bracket 72 which define a channel for receiving the spring 84. The rear end of the channel is closed by a wall 88 and a short post 92 projects from that wall into the channel for capturing one end of spring 84. The opposite end of the spring is engaged on a similar post 94 projecting out from a promontory 96 formed on the inside surface of the head piece 16.

Head piece 16 is connected to the coupling 44 at the rear end of tube 38 by a yoke comprised of a pair of links 102 on opposite sides of bracket 72. The forward ends of links 102 are pivotally connected by pivot pins 104 to collinear protrusions 105 extending inward from opposite sides of the head piece 16 adjacent to the forward end of the head piece and below the pivotal connection of the head piece to the bracket 72. Links 102 extend rearwardly of the bracket 72 and the rear ends of the links are connected by a rod 108 which is arranged to snap into a slot 110 extending in from the top wall of the actuator coupling 44 as best seen in FIGS. 1 and 2. Preferably, the entrance to the slot 110 is smaller than the diameter of rod 108, while the lower end of the slot is slightly larger than the rod so that once the rod is snapped in place, it will remain in the slot and be free to rotate therein.

When the rod 108 is connected to coupling 44 as shown, the spring 84 will normally maintain the head piece 16 in its raised position shown in FIG. 1. With the head piece in this position, the tube 38 is in its fully retracted position shown in FIGS. 1 and 4A. On the other hand, when the head piece 16 is moved downward in the direction of the arrow A in FIG. 1 toward its lower position shown in FIGS. 2 and 3, the tube 38 is moved toward its fully extended position shown in FIGS. 2 and 4C. If necessary, a slot 16a may be provided at the front end of head piece 16 to provide clearance for the tube 38 when that tube is moved to its fully extended position.

Refer now to FIGS. 4A to 4E, which illustrate the operation of applicant's dispenser and, more particularly, the pump section 12b thereof. When the dispenser is in its normal at rest position shown in FIG. 1, the tube 38 is in its fully retracted position shown in FIG. 4A and the plunger 42 is also fully retracted as shown in that same figure. In this condition, the dispensing orifice 46 in tube 38 is located in the housing neck passage 40 so that the orifice is isolated from the atmosphere. Also, the openings 48 in tube 38 are located in the plunger passage 43 between seals 64 and the check valve 34 is open. If now the head piece 16 is moved in the direction of the arrow A shown in FIG. 1, that motion of the head piece is transmitting via the yoke 102, 108 to the coupling 44 and tube 38, causing the tube 38 to move in the direction of the arrow X in FIG. 4B. During this initial movement of tube 38, the plunger 42 remains in its fully retracted position because of its lost motion connection with the tube 38. At this point, the opening(s) 48 in tube 38 are now exposed within pump chamber 28. When the tube 38 is partially extended thusly, a toothbrush B may be placed under the dispensing orifice 46 at the working end of the tube as shown in FIG. 4B.

As soon as the plunger 42 is engaged from behind by the coupling 44, the plunger 42 is advanced along the chamber 28 thereby raising the pressure in that chamber so that any paste-like substance P in the chamber is forced from the chamber through the now exposed openings 48 in the tube 38 and along the tube to the discharge orifice 46 as shown by the curved arrows in FIG. 4C. The elevated pressure in chamber 28 maintains the check valve 34 in its closed position so that no paste can backflow from chamber 28 into the cartridge container 12a. As the tube 38 is advanced and paste is pumped through orifice 46, the brush B may be retracted away from the dispenser at a slightly faster rate such that the paste is deposited evenly along the brush bristles as shown in FIG. 4C.

Figure 4D:
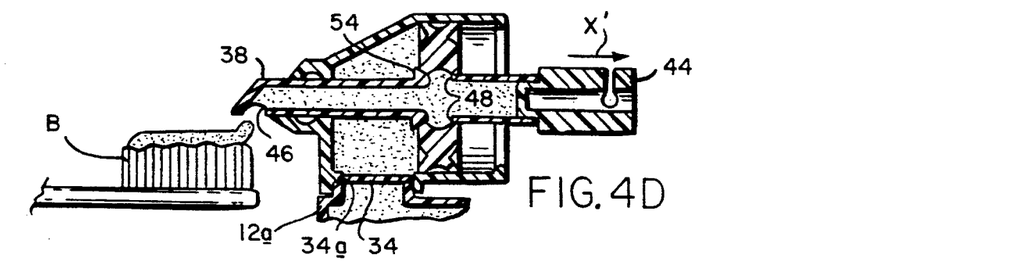

This pressure stroke may continue until the plunger 42 reaches the forward end of the housing section 26a at which point the rib 54 on tube 38 engages the forward end of housing section 26b thereby stopping further forward motion of the tube and plunger. During the pressure stroke, a selected volume of paste P, corresponding to the volume of chamber 28 displaced by the plunger 42, is discharged from orifice 46 onto brush B. The amount of paste dispensed depends upon the extent to which the user has depressed the actuator head piece 16. At the end of the pressure stroke e.g., when the head piece 16 is in its lowest position shown in FIG. 2, the head piece 16 may be released whereupon the head piece is urged by spring 84 to its raised position shown in FIG. 1. Through the actuator linkage 102, 108, the tube 38 is retracted among the axis X' as shown in FIG. 4D, with the plunger 42 remaining in its extended position due to the lost motion connection between the tube and plunger. However, as noted previously, as the tube 38 retracts, a small vacuum is drawn in the pump chamber 28 due to the withdrawal of a larger diameter rear half of tube 38 from chamber 28. Resultantly, paste P is drawn back through tube 38 away from orifice 46 which tends to separate the paste at the orifice from the paste bead on brush B and to keep the oriface clean.

Figure 4E:
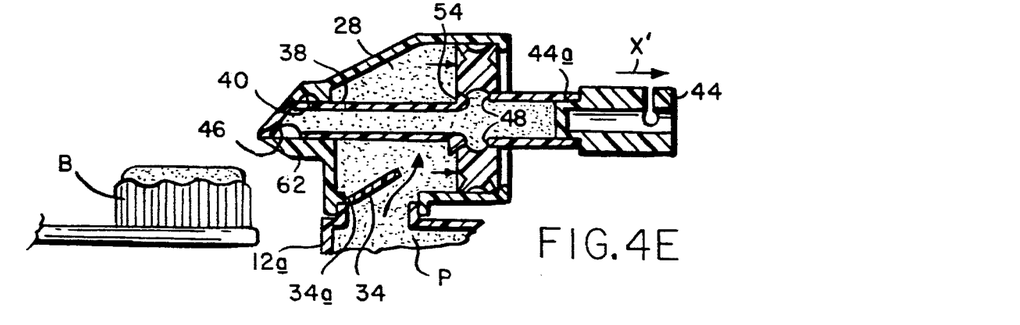

When the plunger is finally engaged from the front by the rib 54 on tube 38, continued retraction of the tube 38 along axis X' moves the plunger 42 toward its fully retracted position shown in FIG. 4E. That motion of the plunger draws a vacuum in the chamber 28. Note that, at this point, the openings 48 in the tube 38 are positioned within the plunger passage 42 and are, therefore, isolated from chamber 28. Consequently, the negative pressure in chamber 28 does not suck paste back through tube 38, but rather causes the check valve 34 to open as shown in FIG. 4E so that additional paste from container 12a is drawn into chamber 28 to replenish the paste volume dispensed during that pumping cycle.

As the tube 38 approaches its fully retracted position, any residual paste P protruding from orifice 46 is sheared off by the walls of passage 40 in housing neck 26c and, due to the thinness of that wall, usually drops onto brush B. As shown in FIG. 4E, when tube 38 is fully retracted, the orifice 46 is completely closed by the wall of passage 40 so that atmospheric air cannot reach, and possibly harden, the paste P inside the tube 38. Resultantly, that paste will be dispensed normally during the next pumping cycle.

At this point, the actuator head piece 16 has returned to its fully raised position shown in FIG. 1 so that the dispenser is ready for the next pumping cycle which will commence when the head piece 16 is pushed down again.

When the container 12a is emptied of paste P, the container may be removed from holder 10. Then, after the actuator rod 108 is snapped out of slot 110 in coupling 44, the actuator bracket 72 may be slid from the housing 26 and installed on a fresh cartridge. After rod 108 is attached to the coupling 44 of that new cartridge, that cartridge may be placed in holder 10 so that the dispenser is ready for reuse. As we shall see in connection with FIG. 9, if the disposable cartridge 12 consists only of the paste container 12a, the actuator 111 may remain attached to pump section 12b with only container 12a being replaced.

It will be seen from the foregoing that the holder/actuator 10, 14, which is a one time purchase, incorporates all of the more expensive parts of our dispenser, including all metal parts such as spring 84 and yoke 102, 108. This enables the disposable cartridge 12 to be constructed entirely of inexpensive plastic material, e.g., high density polyethylene, which can be recycled easily. In fact, the cartridge 12 illustrated in FIGS. 1 and 2 having an integral container and pump section, may consist of as few as six parts, namely: tubular container 12a, follower piston 24, pump housing 26, (including integral valve 34, if present), tube 38, plunger 42 and actuator coupling 44. All of these parts can be made easily in quantity at relatively low cost. Furthermore, the parts are quite easy to assemble using automated machinery forming, for the substance P, self-contained housings with all wetted parts. Therefore, the FIGS. 1 to 3 dispenser as a whole is an environmentally sound product which should be economically competitive in the market place.

Refer now to FIGS. 5 to 8 which show a dispenser incorporating a slightly different cartridge and a somewhat different actuator. It should be understood, however, that the cartridge depicted in those figures can be used with an actuator similar to the one shown in FIG. 1. Similarly, the actuator depicted in FIG. 1 can be used with a cartridge similar to the one shown in FIG. 5.

The FIGS. 5 to 8 dispenser differs from the one in FIG. 1 in that, its container 122 is an elongated plastic bellows capsule whose upper end forms a cylindrical sleeve 122a and whose lower end 122b is closed. A rigid plastic fitting 124 is plugged into the sleeve 122a and sealed thereto. Fitting 124 has a bottom wall 124a containing an opening 126 surrounded by an upstanding flange 126a. Opening 126 may contain a check valve as shown in phantom at valve 128. The cartridge's pump section 132 is supported on fitting 124.

Pump section 132 includes a housing 134 having a generally rigid, frustoconical forward section 134a with a bottom passage 136 which is encircled by a depending flange 136a which surrounds the flange 126a extending up from fitting 124. The two passage flanges are sized to form a vacuum-tight seal between the two.

Like housing 26 in FIG. 1, housing 134 has a generally cylindrical rear section 134b. In this case, however, that rear section is formed as a bellows capsule having a substantially closed rear wall 134c which substitutes for the plunger 42 in the FIG. 1 dispenser. Thus, by moving the bellows capsule wall 134c, the volume of the housing 134 may be varied.

Movable within housing 134 is a tubular member 138 which is more or less the same as the tubular member 38 in the FIG. 1 dispenser. The tubular member 138 extends through a flanged opening 139 in the bellows capsule wall 134*c* and it has a forward or nozzle end 138*a* which is slidable in a passage 142 in the front of housing 134. Furthermore, like the tubular member 38 in FIG. 1, tube 134 is provided with a dispensing orifice 144 near its nozzle end, and one or more additional openings 146 spaced back from orifice 144 within housing 134. Tubular member 138 and the bellows-like housing section 134*b* constitute a piston which operates in more or less the same way as the piston in the FIG. 1 dispenser to draw paste from container 122 and pump it out through the discharge orifice 144 in accordance with FIGS. 4A to 4E. Note that member 138, like tube 38 in FIG. 1, has a smaller diameter in front of openings 146 than aft of those openings to produce a small vacuum in housing 134 when the member is retracted as described above.

The tubular member 138 is moved between its extended and retracted positions by an actuator shown generally at 152 mounted to the top of pump section 132 and releasably linked to the tubular member 138 by a coupling 154 which is plugged into and closes the rear end of that member.

Figure 7:
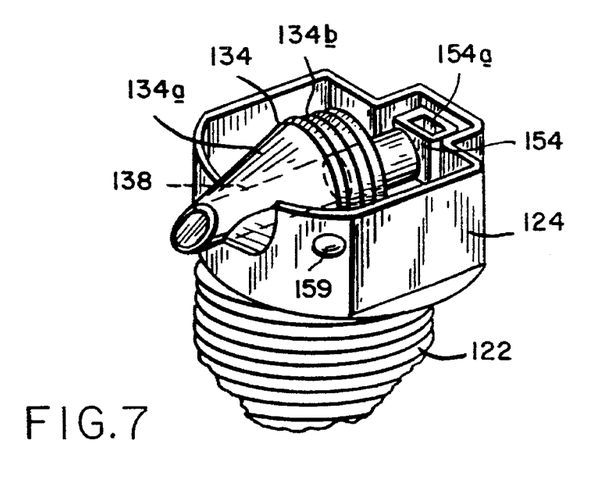
FIG. 7 is a fragmentary isometric view of the FIGS. 5 and 6 dispenser with the actuator removed from the cartridge.
Figure 8:
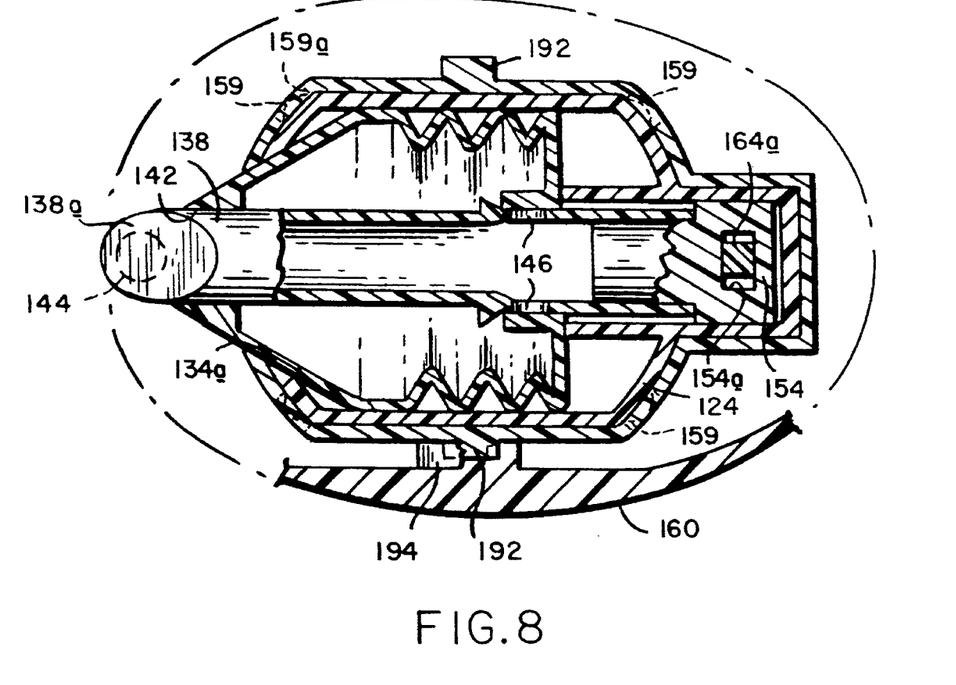
FIG. 8 is a sectional view taken along line 8—8 of FIG. 5.

The actuator 152 includes a sleeve-like bracket 156 arranged to slidably engage over the fitting 124. Preferably, the bracket 156 includes sidewalls which substantially surround fitting 124 and the pump housing 134 and an internal horizontal wall 156*a* which rests on the top of the pump housing 134. Desirably also, suitable recesses 159*a* are provided in the bracket side walls which are engaged by bosses 159 on fitting 124 to releasably retain bracket 156 on fitting 124 as shown in FIGS. 7 and 8.

The bracket 156 is arranged to support a movable head piece 160 similar to head piece 16 in FIG. 1. The head piece is movable about an axis A between a rest position illustrated in FIG. 5 wherein the head piece covers the forward end of pump housing 134 and the working end of tubular member 138 and an activated position shown in FIG. 6 wherein the head piece is rotated away from, and allows the extension of, the tubular member 138. Moreover, the head piece is releasably connected to the coupling 154 so that when the head piece is rotated between its two positions, it moves the tubular member 138 between its operative retracted and extended positions shown in FIGS. 5 and 6, respectively.

The linkage connecting head piece 160 to bracket 156 includes a shaft 162 extending between the side walls of the bracket adjacent to the bracket wall 156*a*. Shaft 162 rotatably supports a lever 164 having a lower arm 164*a* whose end engages in a slot 154*a* in the coupling 154 that is plugged into the rear end of tubular member 138. Lever 164 also has an upper arm 164*b* whose free end extends into a slot 168 formed in a boss 172 at the underside of head piece 160 near the rear edge thereof.

Figure 5:
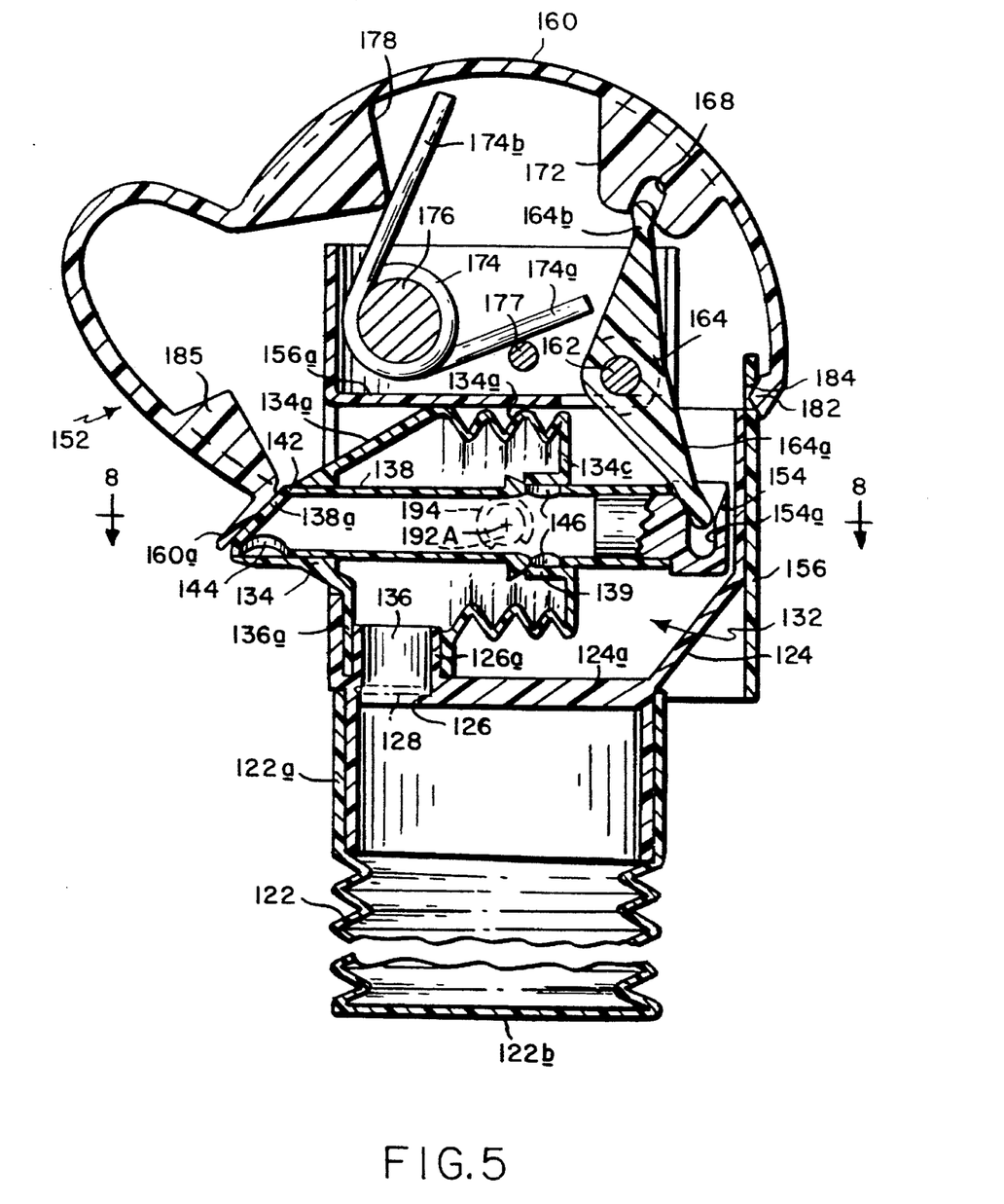
FIGS. 5 and 6 are view 3 similar to FIGS. 1 and 2 showing another dispenser embodiment.
Figure 6:
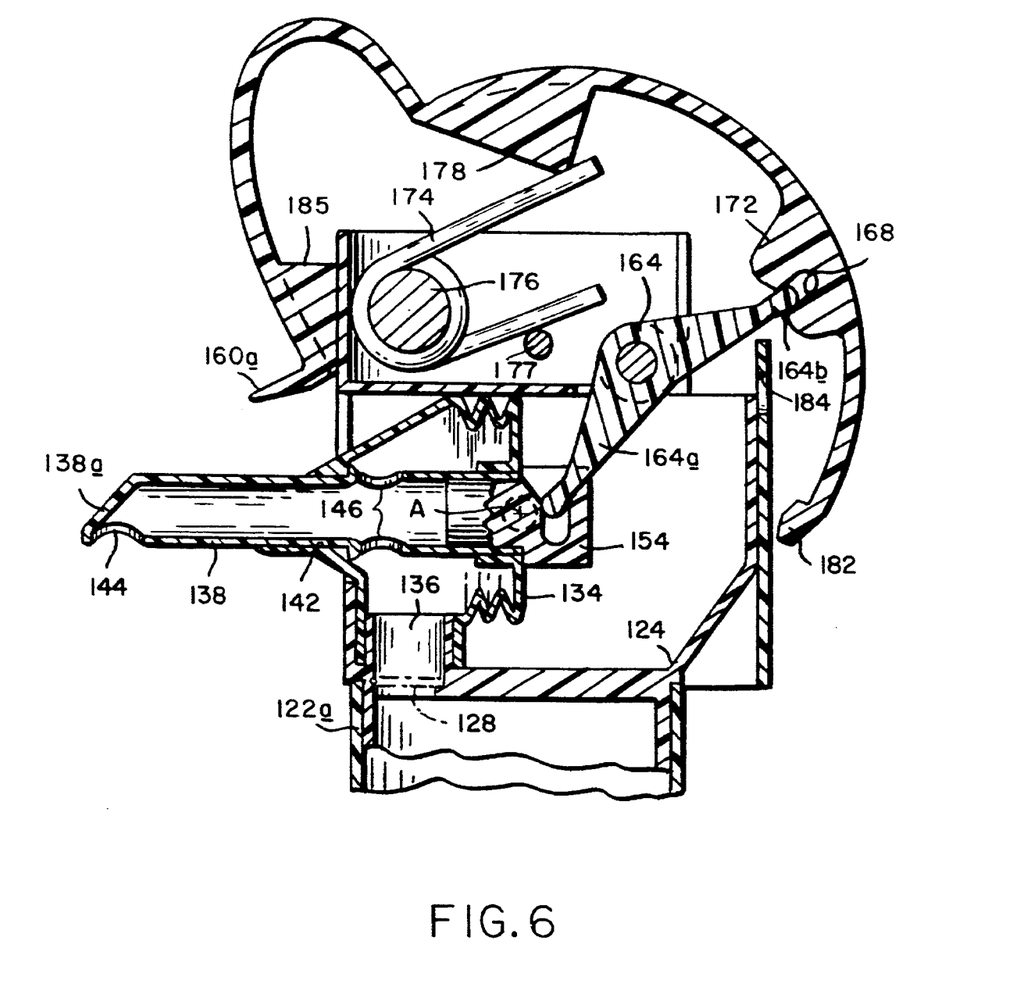

Head piece 160 is biased to its normal rest position shown in FIG. 5 by a spring 174 coiled around a post 176 bridging the side walls of bracket 156. Spring 174 has one end 174*a* which is stopped by a pin 177 projecting out from a side wall of bracket 156. The other spring end 174*b* engages against a boss 178 spaced in front of boss 172 at the underside of head piece 160.

As best seen in FIG. 5, when head piece 160 is in its rest position, the lower edge of the head piece at the rear of the head piece overlaps the upper edge of the bracket 156. Furthermore, a boss or rib 182 is formed at the inner edge of the head piece at that location which is arranged to engage in an opening 184 adjacent to the upper edge of bracket 156.

This boss and slot engagement prevents rotation of the head piece 160 unless it is attached to pump section 132. It also helps to establish the rest position of the head piece and prevents spring 174 from urging head piece 160 in the counter clockwise direction beyond the position shown in FIG. 5. However, when a downward force is applied to the top rear portion of the head piece, the head piece is rotated about axis A. This movement rotates lever 164 about shaft 162 thereby advancing the tubular member 138 to its extended position shown in FIG. 6.

When head piece 160 is depressed significantly, an interior boss 185 at the forward edge of head piece 160 engages the front of bracket 156 to stop further clockwise motion of the head piece. When the downward force on head piece 160 is removed, spring 174 returns the head piece to its position shown in FIG. 5 and that motion, through lever 164, returns tubular member 138 to its retracted position shown in FIG. 5. As best seen in this figure, when head piece 160 is in its rest position, a depending lip 160*a* at the front of the head piece engages and covers the working end 138*a* of tubular member 138 thereby providing a positive stop for the rest position of the head piece.

The bosses 172, 178 and 185 at the underside of the head piece 110 may be molded into the head piece. Alternatively, they may be made together but separately from the head piece and bonded to the appropriate locations at the underside of the head piece.

As best seen in FIGS. 5 and 8, the pivotal connection between the head piece 160 and bracket 156 at axis A is provided by a pair of colinear stub shafts 192, 192 projecting out laterally from the opposite sides of bracket at 156. These shafts are arranged to be received in a pair of circular cut outs or clips 194, 194, formed in the interior walls of head piece 160 at opposite sides thereof.

The head piece 160 may be assembled to bracket 156 quite easily simple positioning lever arm 164*a* over the opening 154*a* in coupling 154 and circular cutouts 194 over the respective shafts 192 and pushing down so that the cutouts clip onto the shafts. The cutouts and shafts will automatically constrain head 160 to rotate about axis A.

When pump section 132 is permanently attached to paste container 122, actuator 152 may be removed from pump section 132 in order to replace the container by pulling up on bracket 156 with sufficient force to release detent bosses 159 from their respective recessesses 159*a* in bracket 156. Lever arm 164*a* will withdraw automatically from coupling opening 154*a* as the actuator separates from the pump section.

In some applications, it may be desirable to make the pump section 132 separable from the container 122. In this way the pump section 132 as well as the actuator 152 may be reused, with the only replacement piece being the container (including fitting 124). For this, the opening flange 126*a* projecting up from fixture 124 may be arranged to releasably plug into the opening flange 136*a* of housing 134 providing a vacuum tight seal between the two flanges. This will further reduce the cost of the replaceable section of the dispenser. In this version of the dispenser, the check valve 34 or 128 need not be used if anti-backup means 24*a* (FIG. 1) are provided under the follower piston 24. This is possible because of the valve action provided by the covering of the tubular member openings 48, 146 by the walls of the plunger opening 43, 139 upon the retraction of the tubular member, as described above.

Figure 9:
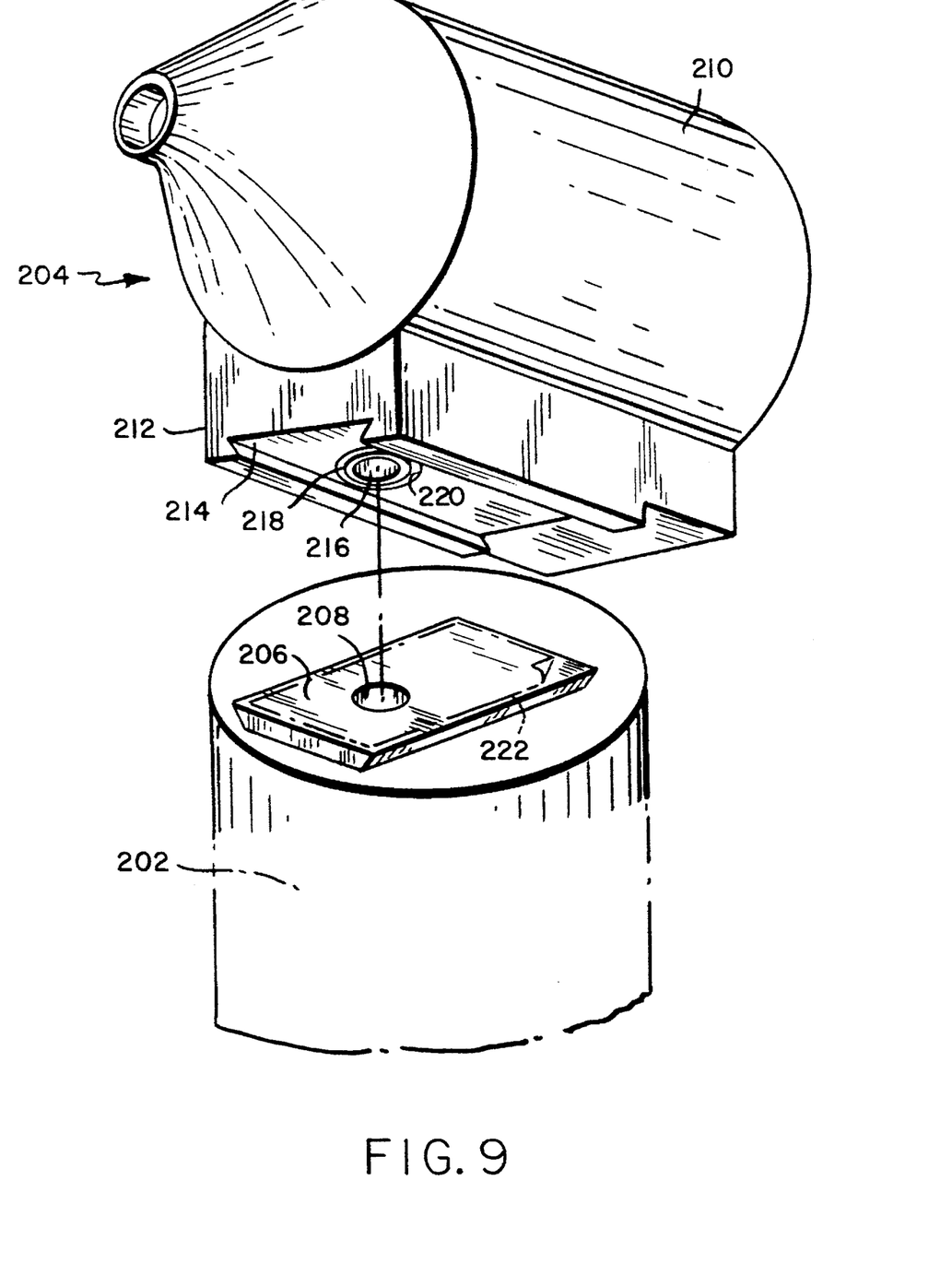
FIG. 9 is an exploded isometric view of a dispenser embodiment whose pump section is separable from the paste container.

FIG. 9 shows a dispenser embodiment whose paste container 202 is separable from its pump section 204. A key 206 is formed on the top of container 202 and an opening 208 extends through the key into the container. Otherwise, container 202 may be similar to container 12*a* in FIG. 1 or container 122 in FIG. 5.

Pump section 204 is similar to pump section 12b or 132 described above except that its housing 210 includes a depending block 212 having a keyway 214 formed in its underside. An opening 216 extends from the floor of the keyway into the housing 210. Preferably, an O-ring 218 or similar seal is provided around opening 216 and captured in a groove 220 so that when the key 206 is slid into keyway 214 until openings 208 and 216 are aligned, the O-ring is compressed creating a vacuum-tight seal between container 202 and pump section 204. Thus, in the FIG. 9 dispenser, only the container 202 is disposable. When that container is empty of paste, it may be detached from the pump section which may then be connected to a new container.

Container 202 may normally be sold with a removable plastic or foil cover over its key 206 and opening 208, as shown in phantom at 222, to protect the container contents.

It will thus be seen that the objects set forth above among those made apparent from the preceding description, are efficiently attained. Also, certain changes may be made in the above constructions without departing from the scope of the invention. Therefore, it is intended that all matter contained in the above description or shown in the accompanying drawings shall be interpreted as illustrative and not in a limiting sense.

It should also be understood that the following claims are intended to cover all the generic and specific features of the invention described herein.

We claim:

1. A dispenser for a viscous substance comprising a disposable container for said substance;

a pump section mounted to the top of said container for pumping said substance from the container, said pump section comprising a housing connected to, and communicating with the interior of, the container, and pumping means including a wall and a tube slidably received in said wall, said pumping means being movable in the housing along a motion axis between extended and retracted positions relative to the housing, so that said tube constitutes both an extensible dispensing conduit for said substance and a mover of said wall, and an actuator for said pump section, said actuator including support means removably attached to said pump section, a target member movably connected to the support means, and means releasably linking said target member to said tube so that when the target member is moved in one direction, the pumping means are moved to said extended position and when the target member is moved in another direction, the pumping means are moved to said retracted position.

2. The dispenser defined in claim 1 and further including a holder for the container.

3. The dispenser defined in claim 2 wherein the holder and the actuator are configured to present a single theme.

4. A dispenser for a viscous substance comprising a container;

pumping means affixed to said container, said pumping means having a movable wall and defining a variable volume chamber;

a passage connecting the interiors of the container and the chamber;

a tubular member having a working end and being movable in said chamber along a motion axis between a retracted position wherein the working end of the tubular member is substantially flush with said pumping means and an extended position wherein the working end of the tubular member projects appreciably from said pumping means, and connecting means for connecting the tubular member and the movable wall so that when the tubular member is moved toward its extended position, the movable wall is moved so as to reduce the volume of said chamber and when the tubular member is moved toward its retracted position, the movable wall is moved so as to increase the volume of said chamber.

5. The dispenser defined in claim 4 wherein the said connecting means comprise a lost-motion connection so that the excursions of the tubular member along the motion axis are greater than those of said movable wall.

6. The dispenser defined in claim 4 and further including a valve in said passage to prevent backflow of fluid from the interior of said chamber to the interior of said container.

7. The dispenser defined in claim 4 wherein said container comprises an elongated bellows capsule.

8. The dispenser defined in claim 4 wherein said container comprises a flexible pouch.

9. The dispenser defined in claim 4 wherein said container, said pumping means, said tubular member and said connecting means are all made of inexpensive plastic material and together comprise a disposable cartridge.

10. The dispenser defined in claim 4 wherein the pumping means comprise a housing and a plunger movable within the housing and constituting said movable wall, and the tubular member extends through the plunger.

11. A dispenser for a viscous substance comprising a disposable container for said substance;

a pump section mounted to the top of said container for pumping said substance from the container, said pump section comprising a housing connected to, and communicating with the interior of, said container, and pumping means including a tube being movable in the housing along an axis between extended and retracted positions relative to the housing, said pumping means including a wall movable within said housing along said axis, said tube extending through said wall, and a lost-motion connection being present between said tube and said wall so that the excursions of the tube along said axis are greater than those of the wall, and an actuator for said pump section, said actuator including support means removably attached to said pump section, a target member movably connected to the support means, and means for releasably linking said target member to said tube so that when the target member is moved in one direction, the pumping means are moved to said extended position, and when the target member is moved in the other direction, said pumping means are moved to said retracted position.

12. The dispenser defined in claim 11 wherein said housing comprises a cylinder, and said movable wall and said tube together comprise a piston which is movable along said axis within said cylinder.

13. The dispenser defined in claim 12 wherein said tube is closed at both ends;

has a first opening in a wall of the tube adjacent to one end of the tube, and has a second opening in a wall of the tube spaced along the tube from said first opening, said second opening being within said cylinder.

14. The dispenser defined in claim 11 wherein said pump section is releasably mounted to the top of said container, and further including coacting locking means on said housing and on said container for releasably locking said housing to said container.

15. The dispenser defined in claim 14 wherein the locking means comprise a key on one of said housing and said container and a keyway on the other of said housing and said container.

16. A dispenser for a viscous substance comprising a container;

pumping means affixed to said container, said pumping means having a movable wall and defining a variable volume chamber;

a passage connecting the interiors of said container and said chamber;

a tubular member having a working end and being movable in said chamber along a motion axis between a retracted position wherein the working end of the tubular member is substantially flush with said pumping means and an extended position wherein the working end of the tubular member projects appreciably from said pumping means, said tubular member also including a wall and being closed at both ends;

means defining an opening in said wall of said tubular member adjacent to the working end thereof;

means defining a second opening in said wall of the tubular member at a location therealong within said chamber, and connecting means for connecting the tubular member and the movable wall so when the tubular member is moved between its extended and retracted positions, the movable wall is moved so as to change the volume of said chamber.

17. A dispenser for a viscous substance comprising a container;

pumping means affixed to said container, said pumping means having a movable wall and defining a variable volume chamber;

a passage connecting the interiors of said container and said chamber;

a tubular member having a working end and being movable in said chamber along a motion axis between a retracted position wherein the working end of the tubular member is substantially flush with said pumping means and an extended position wherein the working end of the tubular member projects appreciably from said pumping means, said container including an elongated tube having a longitudinal axis extending generally perpendicular to said motion axis, the end of said tube opposite said passage being open, and a follower piston closing the open end of said tube, said follower piston being movable within said tube, and connecting means for connecting the tubular member and the movable wall so that when the tubular member is moved between its extended and retracted positions, the movable wall is moved so as to change the volume of said chamber.

18. The dispenser according to claim 17 and further including means in the container for preventing movement of said follower piston away from said passage.

19. A dispenser for a viscous substance comprising a container;

pumping means affixed to said container, said pumping means having a movable wall and defining a variable volume chamber;

a passage connecting the interiors of said container and said chamber;

a tubular member having a working end and being movable in said chamber along a motion axis between a retracted position wherein the working end of the tubular member is substantially flush with said pumping means and an extended position wherein the working end of the tubular member projects appreciably from said pumping means;

connecting means connecting the tubular member and the movable wall so that when the tubular member is moved between said extended and retracted positions, the movable wall is moved so as to change the volume of said chamber, said container, said pumping means, said tubular member, and said connecting means all being made of inexpensive, plastic material and together comprising a disposable cartridge, and an actuator, said actuator including support means removably attached to said cartridge, a target member movably connected to said support means, and means for releasably linking said target member to said tubular member so that when the target member is moved in one direction relative to the support means, the tubular member is moved toward its said extended position and when the target member is moved in another direction relative to the support means, the tubular member is moved toward its retracted position.

20. The dispenser defined in claim 19 and further including holding means for said cartridge.

21. The dispenser defined in claim 20 wherein said holding means and said actuator are of a strong, rigid material and are configured to present a unifying theme.

22. The dispenser defined in claim 20 wherein said actuator includes means for biasing said target member toward said another direction so that said tubular member normally reposes in its said retracted position.

23. A dispenser for a viscous substance comprising a container;

pumping means affixed to said container, said pumping means including a bellows capsule having a movable end wall and defining a variable volume chamber;

a passage connecting the interiors of said container and said chamber;

a tubular member having a working end and extending through said end wall, said tubular member being movable in said chamber along a motion axis between a retracted position wherein the working end of the tubular member is substantially flush with said pumping means and an extended position wherein the working end of the tubular member projects appreciably from said pumping means, and connecting means for connecting the tubular member and the movable end wall so that when the tubular member is moved between its extended and retracted positions, the movable end wall is moved so as to change the volume of said chamber.

24. A dispenser for a viscous substance comprising a container for said substance, said container having an axis, and a pump section mounted to the top of said container for pumping said substance from the container, said pump section comprising a housing connected to, and communicating with, the interior of said container, a wall movable in said housing along a motion axis so as to define a variable volume chamber in said housing, a tube having a working end and being movable in said housing along said motion axis between a retracted position wherein said working end is substantially flush with said housing and an extended position wherein said working end projects appreciably from said housing, and a lost-motion connection between said tube and said wall so that when said tube is moved toward said extended position, said wall is moved so as to reduce the volume of said chamber and when said tube is moved toward said retracted position, said wall is moved so as to increase the volume of said chamber.

25. The dispenser defined in claim 24 wherein said container axis is substantially perpendicular to said motion axis.

* * * * *